June 2, 1925.  1,540,628
F. E. HURXTHAL ET AL
AUTOMATIC TEMPERATURE CONTROL FOR BREAD TOASTERS
Filed Dec. 1, 1924   2 Sheets-Sheet 1
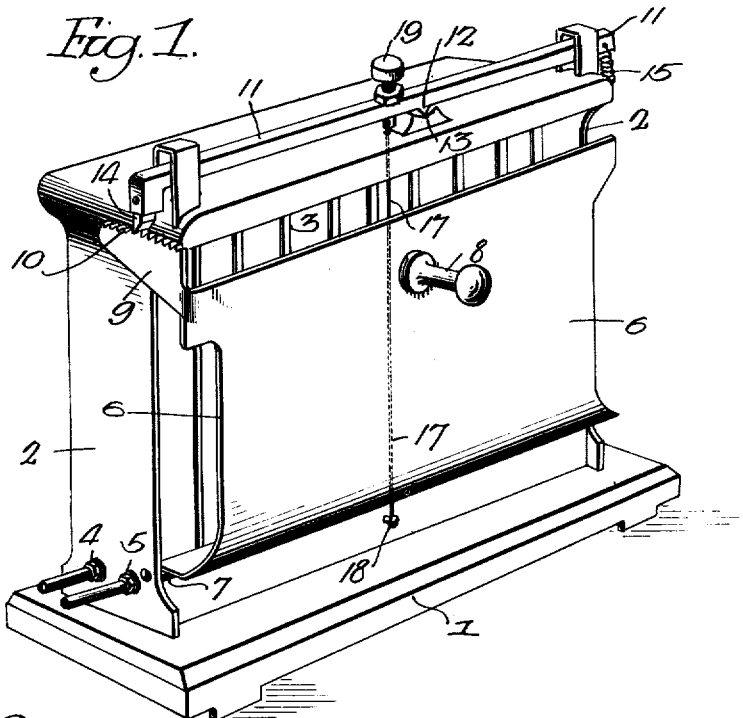
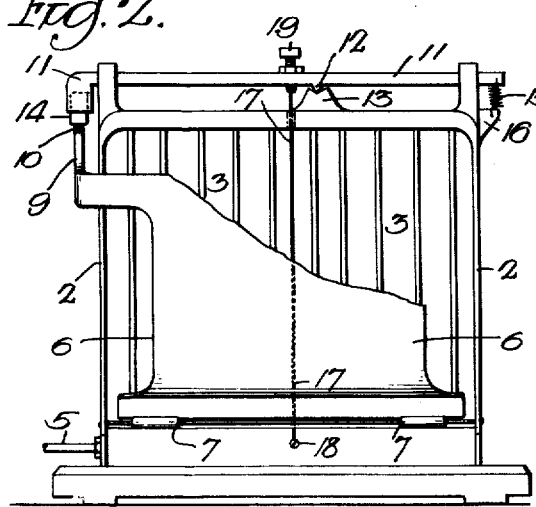
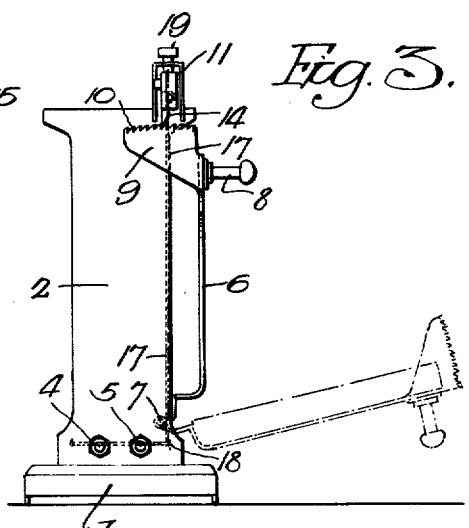
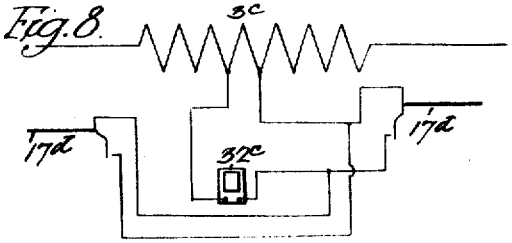
Inventors
Frederick E. Hurxthal,
Alpheus O. Hurxthal
by their Attorneys
Howson & Howson

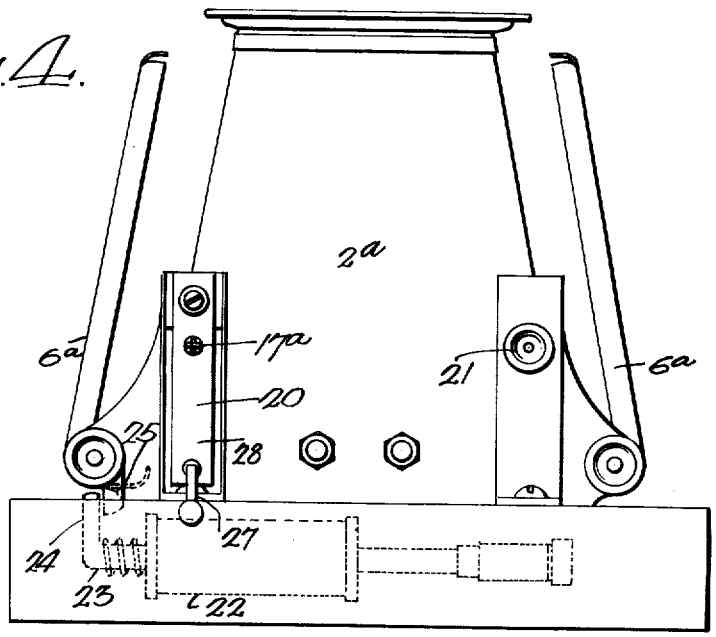
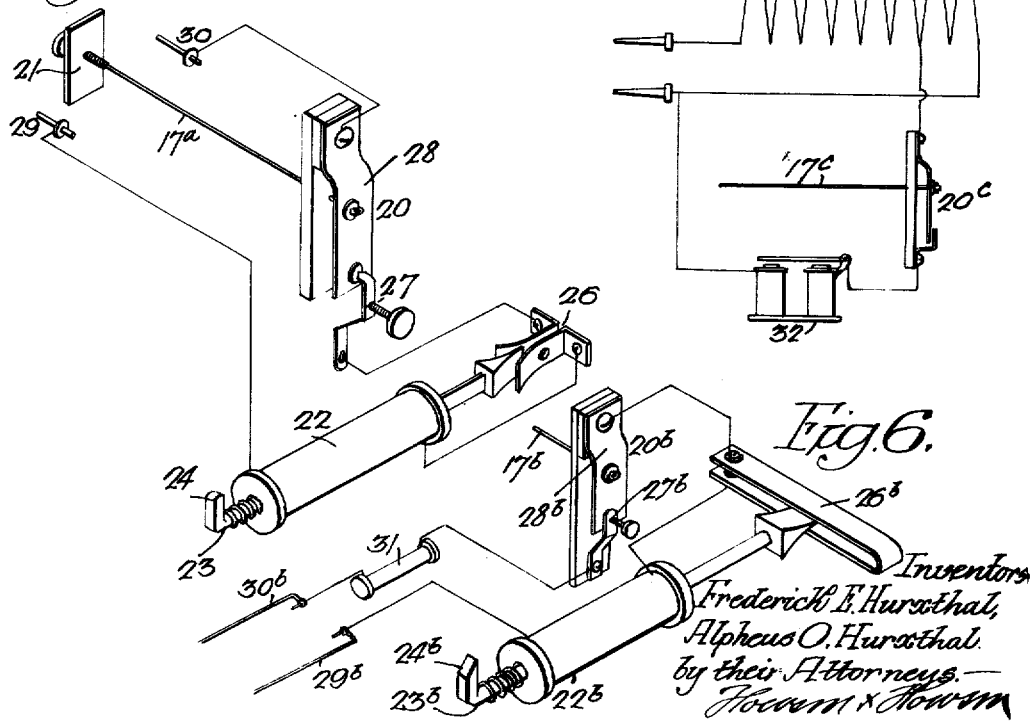

Patented June 2, 1925.

1,540,628

UNITED STATES PATENT OFFICE.

FREDERICK E. HURXTHAL, OF SALEM, OHIO, AND ALPHEUS O. HURXTHAL, OF PHILADELPHIA, PENNSYLVANIA.

AUTOMATIC TEMPERATURE CONTROL FOR BREAD TOASTERS.

Application filed December 1, 1924. Serial No. 753,155.

*To all whom it may concern:*

Be it known that we, FREDERICK E. HURXTHAL and ALPHEUS O. HURXTHAL, residing, respectively, in Salem, Columbiana County, Ohio, and Philadelphia, Philadelphia County, Pennsylvania, have invented certain Improvements in Automatic Temperature Control for Bread Toasters, of which the following is a specification.

The object of this invention is to provide means, such as a sensitive element, for indicating automatically that an edible, such as bread, has been toasted, or seared, to a desired degree, said indicating mechanism being either means for separating the edible from the heating element or the operation of an audible or visible signal. It is also possible to break the electric circuit leading to the toaster.

In the present instance, the invention is shown in connection with an electric toaster of a known type, but it will be understood that it can be applied to a toaster used in connection with any heating device.

In the accompanying drawings:

Fig. 1 is a perspective view of an electric bread toaster embodying our invention;

Fig. 2 is a side view, partly broken away;

Fig. 3 is an end view;

Fig. 4 is a view illustrating a toaster provided with electric release mechanism for the toast carrier;

Fig. 5 is a diagrammatic view showing the electric circuit of the device illustrated in Fig. 4;

Fig. 6 is a diagrammatic view illustrating an electric circuit breaker for the main circuit of the heating element of the toaster;

Fig. 7 is a diagrammatic view illustrating an auxiliary circuit, the opening and closing of which operates an audible, or visible, signal; and Fig. 8 is a diagrammatic view showing a signaling circuit, which is controlled by sensitive elements on each side of a double toaster.

Referring to Figs. 1, 2 and 3 of the drawings, these illustrate an electric toaster having a mechanical means for releasing the bread carrier, actuated by a sensitive element. The base 1 of the electric toaster supports a frame 2. This frame is provided with the ordinary electric heating element 3. The wires supplying the electric current are attached to terminals 4 and 5.

A bread carrier 6 is pivoted, in the present instance, at 7, to the frame 2. The carrier has a hand hold 8. When the carrier 6 is raised, a slice of bread is held parallel with the heating element 3. On one end of the carrier is an arm 9. This arm has a series of ratchet teeth 10. A bar 11 extends across the toaster and has a knife edge point 12 that rests in a V-bearing 13 on the top of the frame.

On one end of the bar is a pawl 14, which is arranged to engage one of the teeth 10 of the arm 9 of the bread carrier. Attached to the other end of the bar is a spring 15, which is connected to a bracket 16 on the frame.

17 designates a wire forming the expansion element. This wire is attached at 18 to the lower portion of the frame 2 and extends through an opening in the upper portion of the frame. It is attached to an adjusting screw 19, which is threaded into the bar 11. On the screw is a jamb nut.

We have discovered that the temperature of a slice of bread, when it is toasted correctly, is fairly definite. The surface of the untoasted bread is comparatively cool, and the wire, or other expansive element 17, assumes the temperature of the bread against, or near, which it is placed. The temperature of the expansion element increases in proportion to the increase in temperature of the surface of the bread. When the surface of the bread has reached a certain degree of heat, and has become toasted, the element 17 has expanded to such an extent as to allow the spring 15 to raise the pawl 14 on the bar 11, clear of the teeth 10 of the bread carrier, allowing the carrier to turn on its pivot and to fall away from the heating elements 3, as shown by dotted lines in Fig. 3.

The bread, one side of which has been toasted to the proper degree, is turned and the carrier is again raised. In the meantime, the wire—or other expansion element— has contracted sufficiently to allow the pawl on the bar 11 to re-engage the teeth of the carrier when raised. The carrier is held until the other surface of the bread is toasted and then it is released again.

By turning the screw 19, the mechanism may be adjusted to allow the bread to remain for different periods so that the surfaces of the bread can be toasted to any degree desired.

While one form of bread toaster to which the invention is applied has been described, it will be understood that the invention can be applied to other forms of toasters. Although only one expansion wire is shown, there may be two or more wires, if desired. Other expansion, or variable, elements, or materials, of varying electrical conductivity may be used. These elements should be arranged so that they will be close to, or against, the surface of the bread to be toasted.

The mechanism for maintaining the carrier in the toasting position may be a mechanical latch, such as illustrated in Figs. 1, 2 and 3, or an electrical element, such as a solenoid. In fact, any device, which can be operated by a sensitive element to release the carrier, or to move the electric heating elements away from the carrier, or to make an audible or visible signal, or to cut out the electric current leading to the toaster, may be employed.

In Figs. 4 and 5, a toaster is illustrated, in which the sensitive wire 17$^a$ is arranged horizontally and is attached to a circuit maker 20 at one side of the toaster frame 2$^a$, and is also attached to adjusting means 21 at the opposite side thereof. A solenoid magnet 22 is so located that its core 23, which has a head 24, is arranged to engage an arm 25 on the bread carrier 6$^a$, when the core is drawn into the magnet. One end of the solenoid magnet 22 is connected to a wire 29 that leads to the heating element. The opposite end of the solenoid magnet is connected to one arm of a circuit breaker 26. The other arm of the circuit breaker is connected to the terminal 27 of the circuit maker 20 to which the sensitive wire 17$^a$ is attached. The contact arm 28 of the circuit maker is connected to the other main wire 30, leading to the heating element.

In Fig. 6 is shown, in diagram, an arrangement by which the circuit leading to the heating element is interrupted when the bread has been toasted to the degree desired, so as to discontinue the toasting.

The core 23$^b$ of the solenoid magnet 22$^b$ has a cam 24$^b$, which is arranged to actuate a switch, or other cut-out device, in the circuit leading to the heating elements. One end of the magnet 22$^b$ is connected to a main wire 29$^b$ and the other end of the magnet is connected to one arm of a circuit breaker 26$^b$. The other arm of the circuit breaker is connected to the arm 28$^b$ of the circuit maker 20$^b$, while the terminal 27$^b$ is connected to the main wire 30$^b$. A resistance coil may be placed in the circuit, as at 31, if desired.

The cam may not only actuate a switch, or other device, to break the circuit leading to the electric heating element, but may also trip the bread carrier, if desired.

In Fig. 7 an arrangement is shown, in which a buzzer, or electric bulb, 32 is in a circuit tapped off of the heating element 3$^c$. The circuit maker 20$^c$, which is controlled by the sensitive element 17$^c$ is in the circuit. When the wire, or other element, elongates, the circuit maker closes the circuit and the buzzer gives an audible signal. A bulb may be substituted for the buzzer, if desired, which is illuminated when the circuit is closed to give a visible signal that the bread has been toasted to the degree desired.

In Fig. 8 is shown, in diagram, one arrangement of providing a signal controlled by a sensitive element 17$^d$ on each side of a double toaster and connected through an auxiliary circuit from the heating element 3$^c$ with a signal, such as a buzzer, 32$^c$, or an electric light.

In the claims, the word "indicating" is used in the broad sense to include separating the bread, or other material, and the heating element, operating the circuit of the heating element, or giving an audible, or visible, signal.

While the toasting of bread has been described, it will be understood that the invention can be used for toasting, or searing, other material without departing from the main features of the invention.

We claim:

1. In a toasting device, a sensitive element located in such relation to the surface of the material to be toasted that it will be affected by the surface temperature of the material, and mechanism, actuated by the sensitive element, for indicating when the material is toasted.

2. The combination in a toaster of a heating element; a carrier for the material to be toasted; and automatic means for stopping the toasting of the material when the surface of the material being toasted has reached a given degree.

3. In a toasting device, a sensitive element located in such relation to the surface of the bread to be toasted that it will be affected by the surface temperature of the bread and will stop the toasting of the bread when a given temperature is reached.

4. The combination in a toaster, of a frame having a heating element; a bread carrier arranged to hold the bread in position to be toasted by said element and means for automatically separating the bread and the heating element when the surface of the bread being toasted has reached a given temperature.

5. The combination in a toaster, of a frame; an electric heating element thereon; a bread carrier arranged to be located in close proximity to the heating element; means for retaining the bread carrier in toasting position; and an expansion element controlling said means, said element being in such position, in respect to the surface of the bread, as to be affected by the surface temperature of the bread.

6. The combination in a toaster, of a frame; an electric heating element thereon; a bread carrier pivoted to the frame; a bar arranged to hold the frame in front of the electric heating element; and a wire attached to the frame and to the bar, said wire being located between the heating element and the bread carrier and arranged in such position, in respect to the surface of the bread, as to be affected by the surface temperature of the bread.

7. The combination in a toaster, of a frame; an electric heating element thereon; a bread carrier pivoted to the frame; a toothed arm on the carrier; a bar pivotally mounted on the frame; a pawl on the bar arranged to engage the toothed arm of the carried; a spring for withdrawing the pawl; and a wire attached to the frame and to the bar and extending between the electric heating element and the bread and arranged in such position, in respect to the surface of the bread, as to be affected by the surface temperature of the bread.

FREDERICK E. HURXTHAL.
ALPHEUS O. HURXTHAL.

the bread, as to be affected by the surface temperature of the bread.

6. The combination in a toaster, of a frame; an electric heating element thereon; a bread carrier pivoted to the frame; a bar arranged to hold the frame in front of the electric heating element; and a wire attached to the frame and to the bar, said wire being located between the heating element and the bread carrier and arranged in such position, in respect to the surface of the bread, as to be affected by the surface temperature of the bread.

7. The combination in a toaster, of a frame; an electric heating element thereon; a bread carrier pivoted to the frame; a toothed arm on the carrier; a bar pivotally mounted on the frame; a pawl on the bar arranged to engage the toothed arm of the carried; a spring for withdrawing the pawl; and a wire attached to the frame and to the bar and extending between the electric heating element and the bread and arranged in such position, in respect to the surface of the bread, as to be affected by the surface temperature of the bread.

FREDERICK E. HURXTHAL.
ALPHEUS O. HURXTHAL.

DISCLAIMER 1,540,628.—*Frederick E. Hurxthal*, Salem, Ohio, and *Alpheus O. Hurxthal*, Philadelphia, Pa. AUTOMATIC TEMPERATURE CONTROL FOR BREAD TOASTERS. Patent dated June 2, 1925. Disclaimer filed January 9, 1932, by the assignee, *Proctor & Schwartz Electric Company*.

Therefore disclaims from the specification the paragraph appearing at lines 84 to 89 of page 2 of the specification, which reads as follows:

"In the claims, the word 'indicating' is used in the broad sense to include separating the bread, or other material, and the heating element, operating the circuit of the heating element, or giving an audible, or visible signal."

Your petitioner also disclaims from the scope of claim 1 all devices except those in which the indicating means, referred to in said claim, is for indicating visibly or audibly.

[*Official Gazette February 9, 1932.*]

DISCLAIMER 1,540,628.—*Frederick E. Hurxthal*, Salem, Ohio, and *Alpheus O. Hurxthal*, Philadelphia, Pa. AUTOMATIC TEMPERATURE CONTROL FOR BREAD TOASTERS. Patent dated June 2, 1925. Disclaimer filed January 9, 1932, by the assignee, *Proctor & Schwartz Electric Company*.

Therefore disclaims from the specification the paragraph appearing at lines 84 to 89 of page 2 of the specification, which reads as follows:

"In the claims, the word 'indicating' is used in the broad sense to include separating the bread, or other material, and the heating element, operating the circuit of the heating element, or giving an audible, or visible signal."

Your petitioner also disclaims from the scope of claim 1 all devices except those in which the indicating means, referred to in said claim, is for indicating visibly or audibly.

[*Official Gazette February 9, 1932.*]